United States Patent

Wong

[11] Patent Number: 6,095,534
[45] Date of Patent: Aug. 1, 2000

[54] COLLAPSIBLE LUGGAGE CART

[75] Inventor: Jacob Y. Wong, Goleta, Calif.

[73] Assignee: Jaesent Inc., Goleta, Calif.

[21] Appl. No.: 09/241,976

[22] Filed: Feb. 1, 1999

[51] Int. Cl.[7] .................................................. B62B 1/12
[52] U.S. Cl. .......................... 280/42; 135/75; 248/464; 280/654; 280/655; 280/47.29
[58] Field of Search ................................. 135/66, 74, 75; 248/169, 171, 435, 464; 280/42, 47.29, 652, 654, 655, 47.27, 40

[56] References Cited

U.S. PATENT DOCUMENTS

| | | | |
|---|---|---|---|
| 2,812,950 | 11/1957 | Holloway | 135/66 X |
| 2,932,526 | 4/1960 | Campbell | 280/47.29 X |
| 3,007,710 | 11/1961 | Sykes | 280/47.29 X |
| 3,058,706 | 10/1962 | Snell | 248/464 X |
| 3,087,535 | 4/1963 | Muller | 248/435 X |
| 3,861,695 | 1/1975 | Shourek et al. | |
| 5,062,653 | 11/1991 | Deglis et al. | |
| 5,755,245 | 5/1998 | Helvoort | 135/66 X |

Primary Examiner—Michael Mar
Attorney, Agent, or Firm—Daniel C. McKown

[57] ABSTRACT

A collapsible luggage cart characterized by left and right telescoping members having top sections and bottom sections, the top sections being pivotally connected so that when the cart is extended for use the telescoping members provide an A-frame back for the cart, each bottom section having an axle on which a wheel is mounted, and each bottom section having a forwardly-extending arm pivotally connected to it, so that when the cart is to be collapsed, the arms are swung upwardly into the bottom sections, the telescoping members are then pivoted together until they are side by side, and finally the telescoping members are collapsed into the bottom sections, the exterior surfaces of which together then substantially enclose the collapsed cart.

6 Claims, 4 Drawing Sheets

COLLAPSIBLE LUGGAGE CART

BACKGROUND OF THE INVENTION

1. Field of the Invention

The present invention is in the field of two-wheeled carts for transporting luggage and similar light loads. The cart is not self-powered, and ordinarily would be pushed or pulled by a human operator.

2. The Prior Art

Travelers arriving or departing from a terminal must arrange to transport their luggage between the loading area of the terminal and their automobile, which may be parked some distance away. Even within a terminal the luggage must be moved a considerable distance. Depending on the weight of the luggage and the physical condition and age of the traveler, the task of moving the luggage can be physically challenging. In an effort to ameliorate this problem, prior inventors have devised a multitude of carts or dollies for use in moving luggage.

Such carts must have a certain degree of strength and size to handle the loads, but once the luggage has been delivered, the size and weight of the cart become disadvantageous. Accordingly, inventors have devised carts that are collapsible, so that they may be easily carried and conveniently stored when not in use, and indeed, that is the goal of the present invention. It is believed that the design of the present invention results in a cart that is lighter in weight, stronger in use, and attractive when collapsed.

The closest prior art presently known is found in U.S. Pat. No. 3,861,695 issued Jan. 21, 1975 to Shourek et al. They show a luggage cart having left and right telescoping members and arms pivotally attached to the lower portion of those members to permit the arms to be swung from a forwardly extending position upwardly to a position adjacent the telescoping member. The left and right telescoping members are interconnected by jointed jack-knifing cross members that extend as the telescoping members are drawn apart laterally. The cross members keep the telescoping members parallel at all times as they are being drawn from their collapsed configuration to their extended configuration. In order to achieve this, the cross members must necessarily be able to pivot with respect to the telescoping members. Accordingly, the cart must be somewhat lacking in rigidity, a problem which the present invention solves.

Also, in the cart of Sourek et al., when the arms are folded up, they assume a position adjacent the lower sections of the telescoping members. In contrast, in the present invention, the arms fold into the lower section of the telescoping members, where they remain concealed.

U.S. Pat. No. 5,062,653 issued Nov. 5, 1991 to Deglis et al. might also arguably be relevant. That patent shows a recreational cart having left and right telescoping members and two wheels. This cart can be distinguished from the present invention by the fact that the telescoping arms remain parallel at all times, and the wheel axles are connected by the body of the cart and thus cannot be separated laterally as in the cart of the present invention.

The present inventor has aspired to invent a collapsible luggage cart having a minimal structure so as to provide the required strength and rigidly with minimum weight. In its collapsed condition, the cart of the present invention has an aesthetically-pleasing tubular shape that is convenient to carry and handle.

SUMMARY OF THE INVENTION

A major objective of the present invention is to provide a luggage cart that is strong and rigid when in use, and that can be collapsed into a configuration that is aesthetically pleasing and easily carried by a traveler.

In accordance with the present invention, this is accomplished by pivotally connecting the top section of a left telescoping member to the top section of a right telescoping member so that when the members are extended, their lower ends can be swung apart to form an A-frame structure that is extremely rigid. Upwardly swingable arms are pivoted to the lowest sections of the telescoping members, and the arms swing into the members when the cart is collapsed, whereby the arms are substantially concealed within the lowest sections when the cart is collapsed.

In accordance with the present invention, when the cart is to be collapsed, the luggage support arms are swung upwardly to a position inside the lowest section of the telescoping members, the lower ends of the telescoping members are then pushed together until they are side by side, and finally, the telescoping members are collapsed into their lowest sections. As a result, in its collapsed configuration, the entire cart, accept for the wheels, is enclosed within the lower sections of the telescoping members. An aesthetically-pleasing appearance is produced by imparting a desired shape and surface ornamentation to the external surfaces of the lowest sections of the left and right telescoping members.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
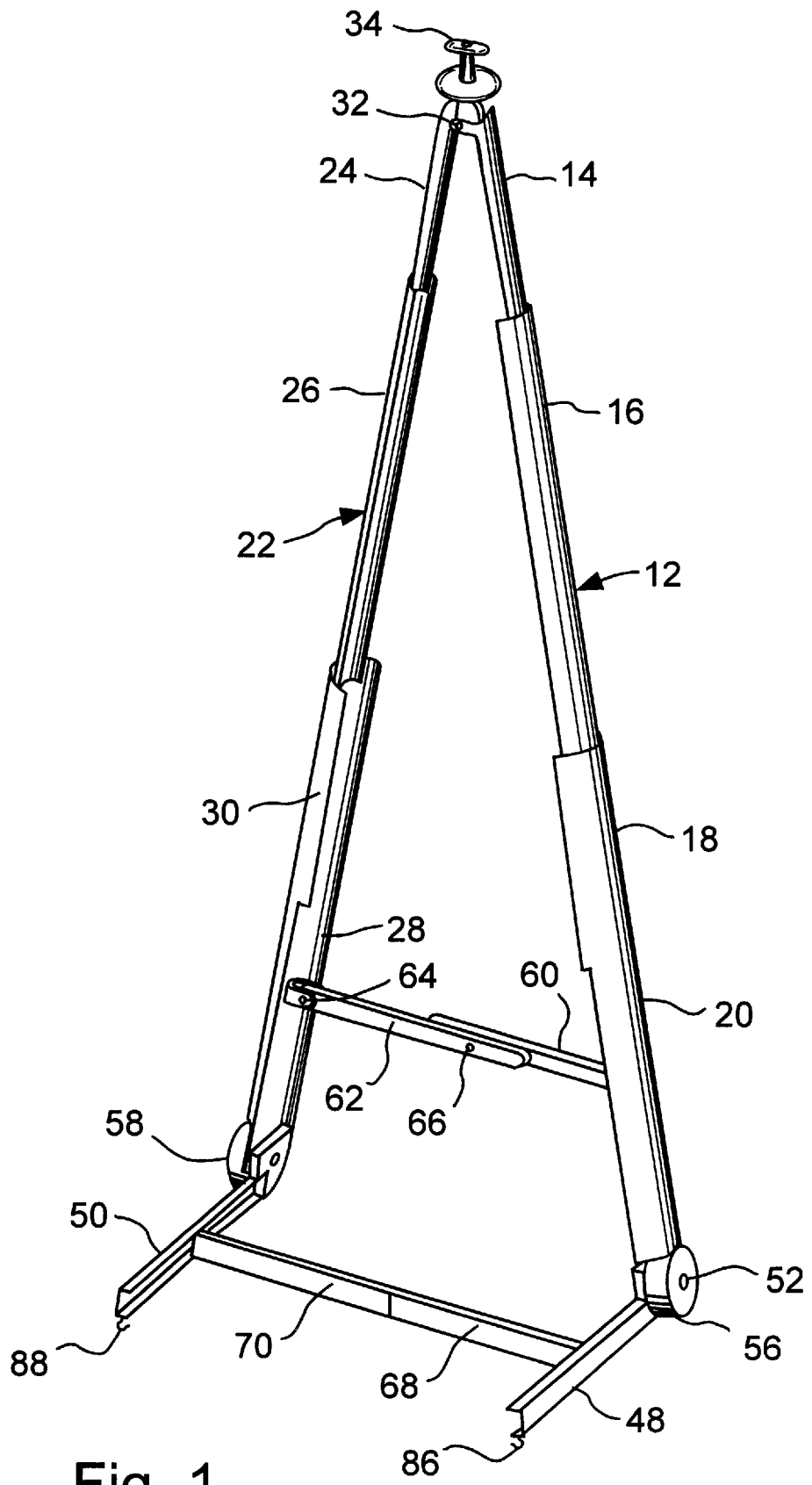
FIG. 1 is a left front top perspective view of a preferred embodiment of the collapsible luggage cart of the present invention, showing the luggage cart in the configuration in which it is used for transporting luggage.

FIG. 1 is a perspective view showing a preferred embodiment of the luggage cart of the present invention. Immediately apparent is the A-frame formed by the left telescoping member 12, the right telescoping member 22 and the collapsible back brace formed by the left back brace member 60 and the right back brace member 62. This structure results in improved rigidity and strength.

The left telescoping member 12 includes a left top section 14, a left intermediate section 16 and a left bottom section 18. In the preferred embodiment, the exterior surface 20 of the left bottom section is ornamented; in one version it is highly polished, while in another version it is covered by a conforming sheet of leather, cloth, or other material.

The right telescoping member 22 includes a right top section 24, a right intermediate section 26 and a right bottom section 28. The exterior surface 30 of the right bottom section is ornamented like the surface 20.

The left and right top sections 14 and 24 are slidably received by the left and right intermediate sections 16 and 26. Likewise, the left and right intermediate sections 16 and 26 are slidably received into the left and right bottom sections 18 and 28. The left top section 14 is pivotally connected to the right top section 24 by the pin 32. A handle 34 is also carried on the pin 32.

Although the telescoping members 12 and 22 include three sections in the preferred embodiment of FIG. 1, the present invention embraces the situation where the telescoping members include only a top section and a bottom section. Also included is the possibility that the telescoping members may include more than three sections, as determined by the ratio of the extended length to the collapsed length. Regardless of the number of telescoping sections, they are all received within the bottom sections when the cart is collapsed.

A left arm 48 is pivotally attached to the left bottom section 18, and a right arm 50 is pivotally attached to the right bottom section 28. The arms 48 and 50 extend forwardly from the left and right bottom sections 18 and 28 when the cart is in use. Indentations or slots in the exterior surfaces 20 and 30 permit the arms to be pivoted into bottom sections 18 and 28. Downward swinging motion of the arm 50 is arrested when a portion 72 of the arm 50 (best seen in FIG. 8) comes into contact with a shoulder on the right bottom section 28.

A left wheel 56 is mounted on a left axle 52 that extends laterally from the left bottom section 18. Similarly, a right wheel 58 is attached to the right bottom section 28. Although the wheels are located laterally outside of the arms 48 and 50 in the embodiment of FIG. 1, it is recognized that in others embodiments the wheels could be located inside of the arms facing one another.

In one variation of the invention, the wheel 56 and the arm 48 are mounted on a common axle and likewise the wheel 58 and the arm 50 are mounted on a common axle. In other embodiments, the axle of the arm 48 may be offset from the axle of the wheel 56.

The luggage cart shown in FIG. 1 is collapsed in the following manner. First, the arms 48 and 50 are swung upward until they are within and aligned with the bottom sections 18 and 28. Next, the left and right back brace members 60 and 62 are swung upward as the telescoping members 12 and 22 are pushed together. Finally, the telescoping members are collapsed by pushing downward on the handle 34. It is seen that the pin 32 insures that the telescoping members move simultaneously and equally in response to pushing down or pulling up of the handle 34.

Figure 2:
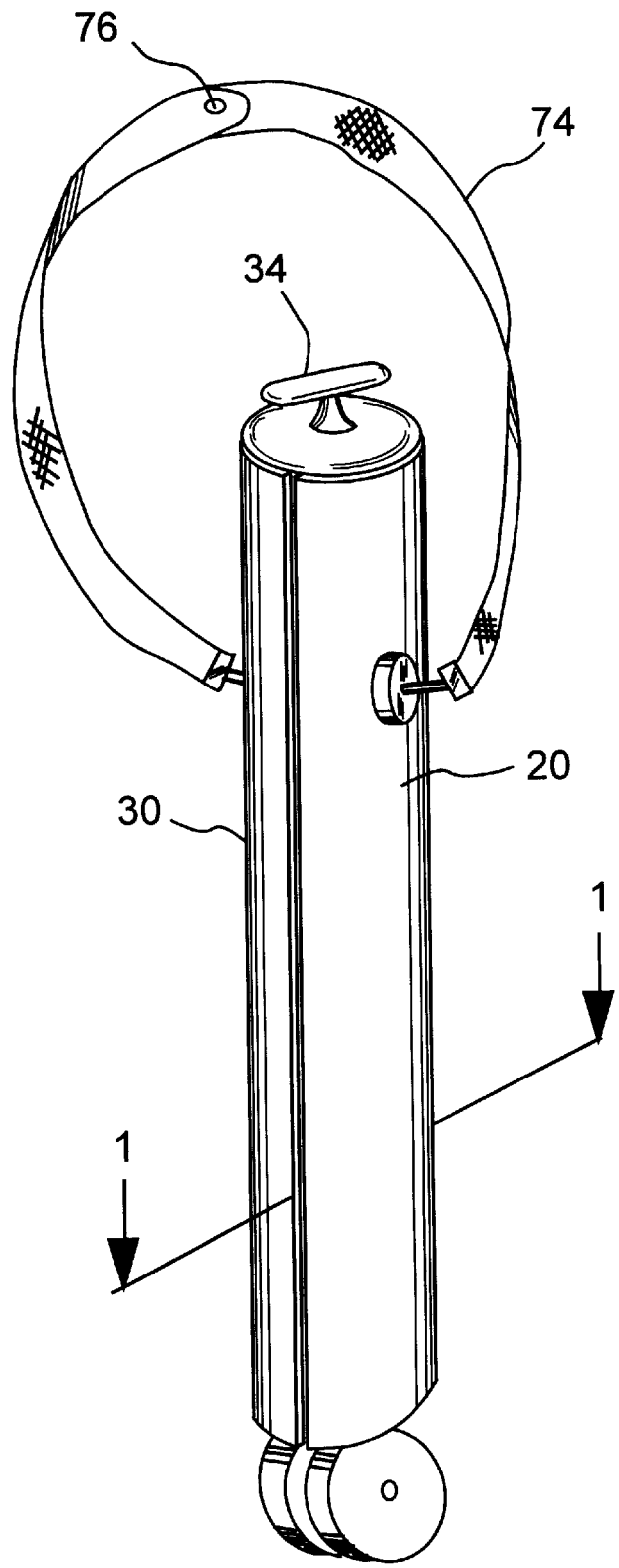
FIG. 2 is a left front top perspective view showing the preferred embodiment of FIG. 1 in its collapsed configuration.

After these steps have been completed, the cart has the collapsed configuration shown in FIG. 2. As seen in FIG. 2, an optional carrying strap 74 may be attached to the surfaces 20 and 30. In the preferred embodiment, the same strap can be unfastened at the snap 76 so that, when the cart is in use, the free ends of the strap can be attached to left and right hooks 86, 88 on the front ends of the arms 48 and 50, whereby the strap, in addition to serving as a carrying strap, can be used to stabilize and secure luggage that is being carried on the cart.

As seen in FIG. 2, the ornamented surfaces 20 and 30 substantially enclose and conceal the cart in the collapsed configuration. In addition, the ornamented surfaces 20 and 30 along with the tubular shape of the collapsed cart provide a pleasing aesthetic appearance.

Figure 3:
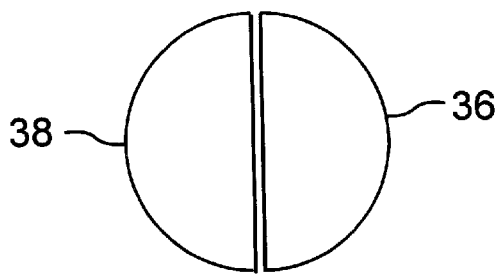
FIG. 3 is a cross sectional view in the direction 1—1 indicated in FIG. 2 in the preferred embodiment.
Figure 4:
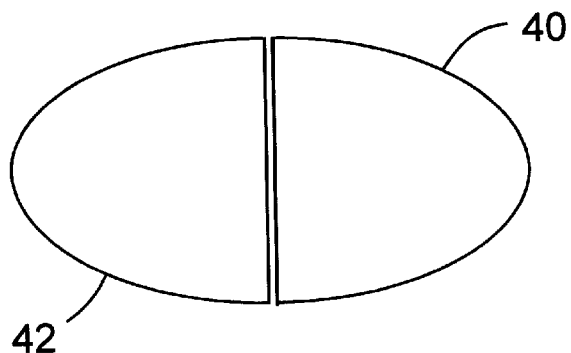
FIG. 4 is a cross sectional view similar to that of FIG. 3, but showing the cross section in a first alternative embodiment.
Figure 5:
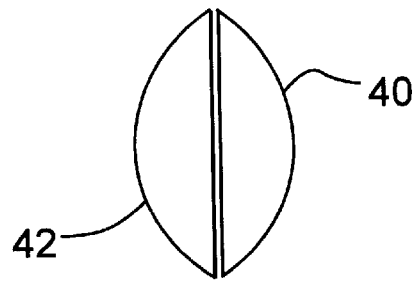
FIG. 5 is a cross sectional view similar to that of FIG. 3, but showing the cross section in a second alternative embodiment.
Figure 7:
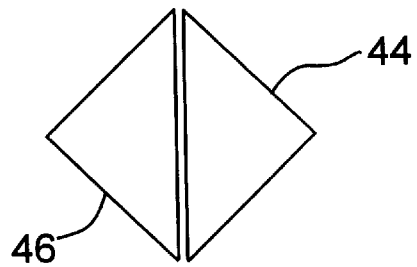
FIG. 7 is a cross sectional view similar to that of FIG. 3, but showing the cross section in a fourth alternative embodiment; and, FIG. 8 is a left front top fractional perspective view showing in greater detail the right arm and cross member of the preferred embodiment of FIG. 1.
Figure 6:
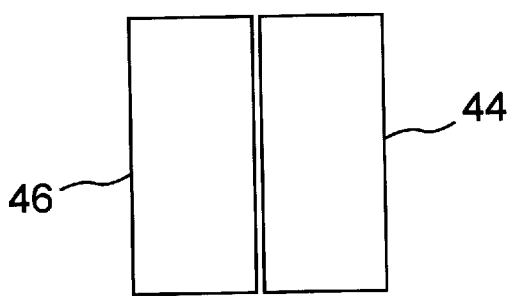
FIG. 6 is a cross sectional view similar to that of FIG. 3, but showing the cross section in a third alternative embodiment.

In the preferred embodiment shown in FIGS. 1 and 2, the surfaces 20 and 30 have convex semi-cylindrical portions 36 and 38 of FIG. 3. However, the present invention embraces other cross sectional shapes such as the convex semi-elliptical portions 40 and 42 of FIGS. 4 and 5, as well as the semi-rectangular portions 44 and 46 of FIGS. 6 and 7.

Figure 8:
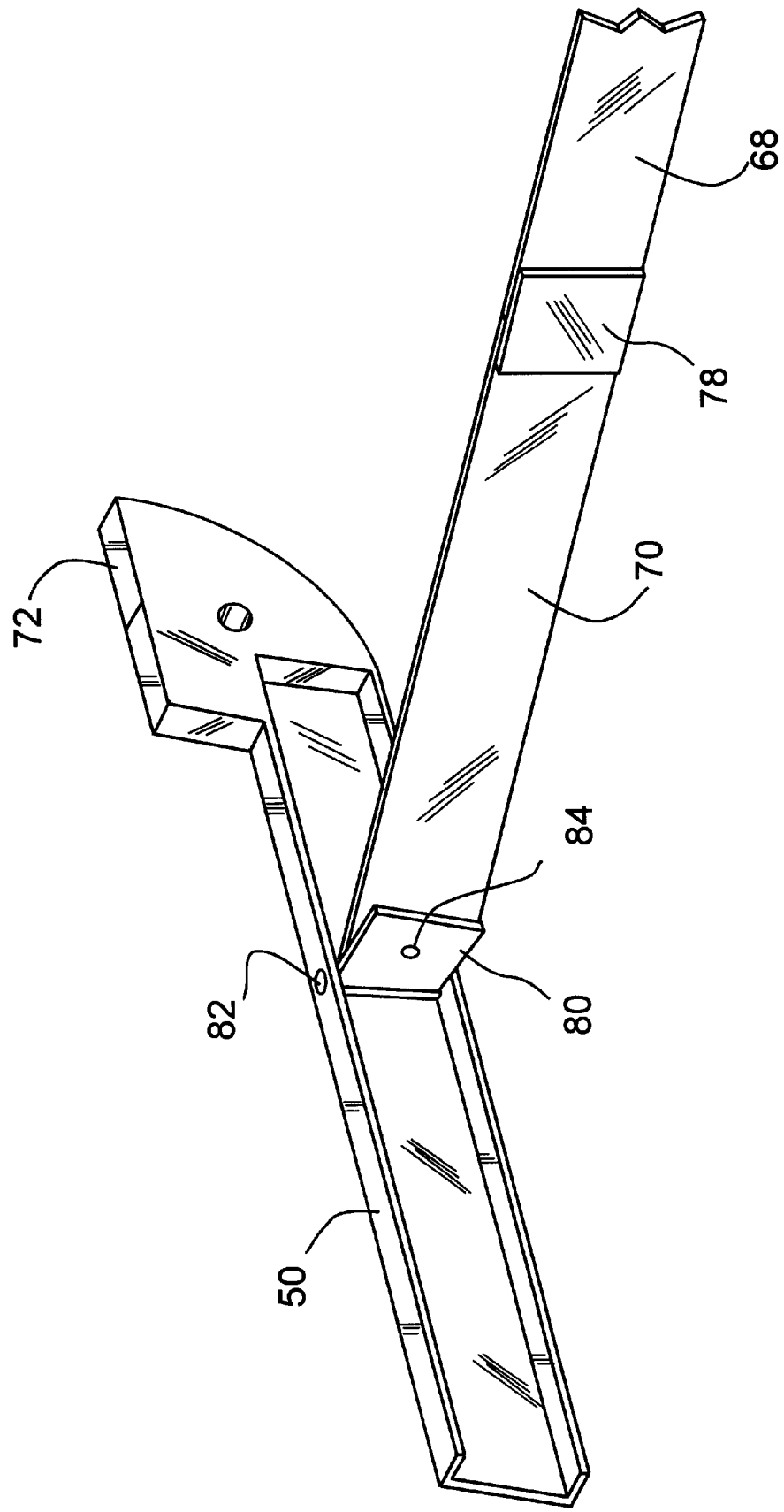

After the left and right telescoping members 12 and 22 have been spread to the positions shown in FIG. 1, the arms 48 and 50 are swung out of the lowest sections 18 and 28 and swung downward to the positions shown in FIG. 1. It will be recognized that the arms are moved in different inclined planes. This necessitated a special design, shown in FIG. 8, for the lateral arm brace that includes the left arm brace member 68 and the right arm brace member 70. These members 68 and 70 are hinged together by the hinge 78, which permits the arm brace to fold in half as the telescoping members 12 and 22 are pushed together. However, because the arms 48 and 50 swing in different inclined planes, the member 70 is pinned to the plate 80 by the pin 84, and the plate 80 is pivotally connected to the arm 50 by the pin 82. FIG. 8 correctly shows that the right arm brace member 70 lies flush against the plate 80 but is rotated with respect to it about the pin 84 due to the angle between the telescoping members 12 and 22. A similar connection is used at the left end of the arm brace.

Thus, there has been described a collapsible luggage cart having minimal structure, which makes it light in weight for ease of carrying. Portability is further enhanced by the manner in which the cart collapses into a small tubular configuration in which the parts of the cart are enclosed by the external surfaces of the lowest sections of the telescoping back members. These surfaces are ornamented to give the collapsed cart an attractive appearance.

A simple three step procedure is used for deploying the cart from its collapsed configuration to its ready-to-use configuration. First, the telescoping members are extended by pulling upwardly on a handle. Next, the lower ends of the telescoping members are spread apart, the telescoping members remaining pinned together at their upper ends. Finally, the left and right arms are swung forward and downward from their concealed position within the lower ends of the telescoping members until they extend forward and approximately perpendicular to the telescoping members which serve as the back of the cart.

Thus, there have been described a preferred embodiment of a collapsible cart and several alternative embodiments and variations of it. Additional variations which would be apparent to workers in the field are considered to be encompassed within the present invention, which is defined by the following claims.

What is claimed is:

1. In a luggage cart that is collapsible into a form substantially enclosed within a tubular shaped outer case, said cart including a left telescoping member and a right telescoping member, each having upper ends which are pivotally connected and which are pivoted together in a side-by-side relationship when the luggage cart is in a collapsed mode, said left telescoping member having a plurality of retractable sections including a left bottom section that includes an exterior surface, and said right telescoping member having a plurality of retractable sections including a right bottom section that includes an exterior surface, a wheel rotatably attached to a lower end of each of the left and right bottom sections, the improvement comprising:

left and right support arms pivotally connected to lower ends of respective inwardly facing edge portions of the left and right bottom sections;

a slot formed in an inwardly facing edge portion of each of the left and right bottom sections for permitting the left and right support arms to pivot to a retracted position within the respective left and right bottom sections when the cart is in the collapsed mode;

the exterior surface of the left bottom section being formed as an elongated semi-cylindrical portion whose convex surface faces away from said right telescoping member, and the exterior surface of the right bottom member being formed as an elongated semi-cylindrical portion of the left and right bottom sections whose convex surface faces away from said left telescoping member; and the two semi-cylindrical portions of the left and right bottom sections mate to substantially enclose the telescoping members and the support arms forming the luggage cart into said tubular shaped outer case when the plurality of sections of each of the left and right telescoping members are retracted and the left and right telescoping members are pivoted together to collapse the cart.

2. A collapsible luggage cart comprising:

a left telescoping member having a plurality of retractable sections including a left bottom section having a left external surface, and including at least one section that is collapsible into the left bottom section, and including a left wheel rotatably attached to a lower end of the left bottom section;

a right telescoping member having a plurality of retractable sections including a right bottom section having a right external surface, and including at least one section that is collapsible into the right bottom section, and including a right wheel rotatably attached to a lower end of the right bottom section;

pivot means for pivotally connecting upper ends of said left telescoping member and said right telescoping member;

left and right support arms pivotally connected to lower ends of respective inwardly facing edge portions of the left and right bottom sections;

a slot formed in an inwardly facing edge portion of each of the left and right bottom sections for permitting the left and right support arms to pivot to a retracted position within the respective left and right bottom sections when the cart is in a collapsed mode;

a collapsible back brace connected to said left telescoping member and to said right telescoping member, said left telescoping member, said right telescoping member and said collapsible back brace forming an A shape when the cart is in an extended ready-to-use configuration;

the external surface of the left bottom section is formed as an elongated semi-cylindrical portion having a convex surface facing away from said right telescoping member, and the external surface of the right bottom member is formed as an elongated semi-cylindrical portion having a convex surface facing away from said left telescoping member; and the two semi-cylindrical portions of the left and right bottom sections mate to substantially enclose the telescoping members and the support arms into a cylindrically shaped tubular outer case when the plurality of retractable sections are collapsed and are pivoted together to configure the cart into the collapsed mode.

3. A collapsible luggage cart as recited in claim 2 wherein the left and right arms extend outwardly and forwardly from said left and right bottom sections, respectively, when the cart is in the ready-to-use configuration and are substantially parallel to said left and right bottom sections when the cart is in the collapsed configuration.

4. A collapsible luggage cart as recited in claim 3 further comprising a left strap connected to the left external surface, a right strap connected to the right external surface, and a connector for connecting the left strap to the right strap.

5. A collapsible luggage cart as recited in claim 4, wherein the left arm has a left hook and the right arm has a right hook.

6. A collapsible luggage cart as recited in claim 5, wherein the left strap is adapted to connect to the right hook and the right strap is adapted to connect to the left hook when the cart is in a ready-to-use configuration.

* * * * *